US009200438B2

(12) United States Patent
Blanchard et al.

(10) Patent No.: US 9,200,438 B2
(45) Date of Patent: Dec. 1, 2015

(54) ACOUSTIC ABSORBENT WALL COATING

(75) Inventors: Benjamin Blanchard, Taverny (FR); Erisela Nikaj, Paris (FR); Katarzyna Chuda, Villejuif (FR); Sylvain Berger, Paris (FR)

(73) Assignee: SAINT-GOBAIN ADFORS, Chambery (FR)

( * ) Notice: Subject to any disclaimer, the term of this patent is extended or adjusted under 35 U.S.C. 154(b) by 137 days.

(21) Appl. No.: 14/235,326

(22) PCT Filed: Jul. 16, 2012

(86) PCT No.: PCT/FR2012/051685
§ 371 (c)(1),
(2), (4) Date: Mar. 14, 2014

(87) PCT Pub. No.: WO2013/014363
PCT Pub. Date: Jan. 31, 2013

(65) Prior Publication Data
US 2014/0224407 A1 Aug. 14, 2014

(30) Foreign Application Priority Data

Jul. 28, 2011 (FR) .................................. 11 56902

(51) Int. Cl.
*E04F 13/072* (2006.01)
*E04F 13/075* (2006.01)
*B29C 65/48* (2006.01)
*B32B 37/12* (2006.01)
*B32B 37/14* (2006.01)
*C09J 5/00* (2006.01)
*E04B 1/84* (2006.01)
*B32B 5/02* (2006.01)
*B32B 5/18* (2006.01)
*B32B 5/24* (2006.01)
*B32B 5/26* (2006.01)
*B32B 7/14* (2006.01)
*B32B 17/02* (2006.01)
*G10K 11/168* (2006.01)
*E04F 13/00* (2006.01)
*E04F 13/08* (2006.01)
*G10K 11/162* (2006.01)
*E04B 1/86* (2006.01)

(52) U.S. Cl.
CPC . *E04B 1/84* (2013.01); *B32B 5/022* (2013.01); *B32B 5/024* (2013.01); *B32B 5/18* (2013.01); *B32B 5/245* (2013.01); *B32B 5/26* (2013.01); *B32B 7/14* (2013.01); *B32B 17/02* (2013.01); *E04B 1/8409* (2013.01); *E04B 1/86* (2013.01); *E04F 13/002* (2013.01); *E04F 13/0867* (2013.01); *G10K 11/162* (2013.01); *G10K 11/168* (2013.01); *B32B 2262/0284* (2013.01); *B32B 2262/12* (2013.01); *B32B 2264/108* (2013.01); *B32B 2266/0278* (2013.01); *B32B 2266/0285* (2013.01); *B32B 2307/102* (2013.01); *B32B 2419/00* (2013.01); *B32B 2607/00* (2013.01); *E04B 2001/8466* (2013.01); *Y10T 428/24851* (2015.01)

(58) Field of Classification Search
CPC ........... E04B 1/84; E04B 1/8409; E04B 1/86; G10K 11/162; G10K 11/168; E04F 13/002; E04F 13/0867; B32B 5/02; B32B 5/024; B32B 5/18; B32B 5/245; B32B 5/26; B32B 7/14; B32B 17/02; B32B 17/10; B32B 38/0036; Y10T 428/24851; D04H 1/42; D06N 3/0045; B29C 65/18; B29C 66/43
USPC .............. 156/71, 306.2, 309.6; 428/174, 175, 428/212, 220, 304.4, 332, 340
See application file for complete search history.

(56) References Cited

U.S. PATENT DOCUMENTS

| 4,283,457 | A | * | 8/1981 | Kolsky et al. | .................... 442/30 |
| 4,388,366 | A | * | 6/1983 | Rosato et al. | ................. 442/374 |
| 4,766,028 | A | * | 8/1988 | Rich | ............................... 442/58 |
| 5,364,681 | A | * | 11/1994 | Pate et al. | ..................... 428/137 |
| 5,493,081 | A | * | 2/1996 | Manigold | ...................... 181/286 |
| 5,632,844 | A | * | 5/1997 | Pate et al. | ..................... 156/290 |
| 5,681,408 | A | * | 10/1997 | Pate et al. | ....................... 156/71 |
| 5,824,973 | A | * | 10/1998 | Haines et al. | ................. 181/286 |

(Continued)

FOREIGN PATENT DOCUMENTS

| CH | 650 196 | 7/1985 |
| DE | 93 00 151 | 3/1993 |
| DE | 100 01 778 | 8/2000 |
| EP | 0 271 681 | 6/1988 |
| EP | 0 620 109 | 10/1994 |
| EP | 0 637 820 | 2/1995 |
| FR | 2 672 908 | 8/1992 |

OTHER PUBLICATIONS

Beranek, L., "Acoustic Impedance of Porous Materials," J. Acoust. Soc. Am., vol. 13, Jan. 1942, pp. 248-260.

(Continued)

*Primary Examiner* — Sing P Chan
(74) *Attorney, Agent, or Firm* — Pillsbury Winthrop Shaw Pittman LLP

(57) ABSTRACT

A multilayer sound-absorbing covering includes (a) a support layer made of an organic polymer foam having an open porosity between 0.50 and 0.995, (b) a surface layer formed by a glass textile, having a static air flow resistance, measured according to the standard ISO 9053, between 105 N·s·m-4 and 106 N·s·m-4, (c) at the interface between the support layer (a) and the surface layer (b), a discontinuous adhesive layer having a surface density between 17 and 60 g/m². There is also provided a process for manufacturing such a covering and the use of such a covering for improving the acoustic comfort of a room or of a building.

21 Claims, No Drawings

(56) References Cited

U.S. PATENT DOCUMENTS

| | | | |
|---|---|---|---|
| 6,030,559 A * | 2/2000 | Barry et al. | 264/46.3 |
| 6,204,209 B1 * | 3/2001 | Rozek et al. | 442/374 |
| 6,220,388 B1 * | 4/2001 | Sanborn | 181/290 |
| 6,256,600 B1 * | 7/2001 | Bolton et al. | 703/6 |
| 6,345,688 B1 * | 2/2002 | Veen et al. | 181/290 |
| 6,428,652 B1 * | 8/2002 | Kolhammer et al. | 156/283 |
| 6,443,257 B1 * | 9/2002 | Wiker et al. | 181/290 |
| 6,720,068 B1 * | 4/2004 | Vanbemmel et al. | 428/317.9 |
| 6,841,025 B2 * | 1/2005 | Kolhammer et al. | 156/283 |
| 6,863,970 B2 * | 3/2005 | Novak | 428/309.9 |
| 6,902,694 B2 * | 6/2005 | Novak | 264/46.4 |
| 7,096,890 B2 * | 8/2006 | Woolstencroft et al. | 138/98 |
| 7,137,477 B2 * | 11/2006 | Keller et al. | 181/286 |
| 7,320,739 B2 * | 1/2008 | Thompson et al. | 156/308.2 |
| 7,591,346 B2 * | 9/2009 | Thompson et al. | 181/291 |
| 2002/0117352 A1 * | 8/2002 | Veen et al. | 181/292 |
| 2009/0173569 A1 * | 7/2009 | Levit et al. | 181/286 |
| 2009/0173570 A1 * | 7/2009 | Levit et al. | 181/286 |

OTHER PUBLICATIONS

International Search Report as issued for International Application No. PCT/FR2012/051685, dated Oct. 29, 2012.

International Preliminary Report on Patentability and the Written Opinion of the International Searching Authority as issued in International Patent Application No. PCT/FR2012/051685, dated Jan. 28, 2014.

* cited by examiner

ACOUSTIC ABSORBENT WALL COATING

CROSS-REFERENCE TO RELATED APPLICATIONS

This application is the U.S. National Stage of PCT/FR2012/051685, filed Jul. 16, 2012, which in turn claims priority to French Application No. 1156902, filed Jul. 28, 2011. The content of both applications are incorporated herein by reference in their entirety.

The present invention relates to a paintable multilayer wall covering comprising a glass textile adhesively bonded to an open-porosity foam and which, even in the painted state, has a high sound absorption capacity. It also relates to a process for manufacturing such a covering and the use thereof for improving the acoustic comfort of a room or of a building.

The concept of "acoustic comfort", like the idea of comfort in general, is a relatively subjective concept. However, it is generally agreed to define good acoustic comfort by a good intelligibility of sounds such as human voices or music, a reverberation time that is neither too short to avoid the impression of muffled sounds, nor too long to avoid a residual echo that is too pronounced, and the absence of sound having an excessive sound power. The quality of the acoustic comfort is mainly governed by the attenuation of sounds using sound-absorbing materials, fixed for example to the walls and/or to the floor.

It is important to distinguish acoustic comfort from acoustic insulation. When sound encounters an obstacle, such as a wall of a building, one portion of the incident sound energy is reflected, another is absorbed and a third is transmitted by the obstacle. The purpose of acoustic insulation is to reduce the transmission of sound, whereas the objective of improving acoustic comfort is the reduction and optimization of the reflected component of the sound.

The two most used parameters for evaluating the quality of acoustic comfort are the reverberation time and the sound absorption coefficient, also referred to as the Alpha Sabine index ($\alpha_w$). The latter is defined as the ratio of the sound energy absorbed by a given material to the incident sound energy ($E_a/E_i$). The Alpha Sabine index is determined by diffuse field measurements carried out according to the standard NF EN ISO 354 (measurement of sound absorption in a reverberation room) and is calculated in accordance with the standard NF EN ISO 11654 (Absorbers for use in buildings—Evaluation of the sound absorption).

From the sound absorption coefficient obtained in a diffuse field, various classes of performance are defined, described in the standard NF EN ISO 11654.

Generally, a sound-absorbing material or covering having a given porous structure and chemical nature absorbs sound much more effectively when it is thick, in other words its $\alpha_w$ index increases with the thickness. For reasons that are easy to understand, it is not however desirable to market wall coverings having an excessive thickness. They would require large storage and transport capacities and their installation by private individuals would be difficult. An excessive thickness, for example beyond around 1 cm, would also pose esthetic problems, in particular in the field of housing for private individuals.

Another problem of sound-absorbing wall coverings is their surface appearance. The best sound absorption properties are generally obtained with coatings that have a porous surface layer, highly permeable to air and therefore to sound. Such porous surface layers are not however always satisfactory from an esthetic viewpoint, in particular they are not generally intended to be painted, and when they may be covered with a layer of paint, their sound absorption capacity decreases drastically.

The objective of the present invention is to propose a paintable wall covering having, even in the painted state, a sound absorption coefficient that enables it to be classified, as a sound-absorbing covering according to the standard NF EN ISO 11654, at least in class E ($\alpha_w$=0.15 to 0.25), or even in class D ($\alpha_w$=0.30 to 0.55), and of which the thickness, before painting, does not exceed 6 mm. The wall covering of the present invention must thus combine good sound absorption properties and a satisfactory esthetic appearance, as close as possible to commercial paintable wall coverings, such as the coverings based on glass fiber cloth.

A certain number of documents describe sound-insulating multilayer wall coverings.

Thus, application CH 650 196 describes a multilayer wall covering comprising an open-porosity foam support containing fillers and fire-retardant components, and a textile surface layer, for example made of polyester. Inserted between the two layers is a perforated aluminum foil, intended to improve the fire resistance of the covering.

Application FR 2 672 908 describes a multilayer wall covering in which a layer of fabric is adhesively bonded by means of a heat-sealing continuous film to a foam support, which foam support is in turn adhesively bonded by means of a second heat-sealing continuous film to an underlayer.

Similarly, FR 0 061 369 discloses a wall covering in which a synthetic polymer textile is adhesively bonded by means of a heat-sealing continuous film made of polyethylene to a sheet of open-porosity foam.

EP 0 271 681 discloses a sound-absorbing wall covering in which an air-permeable paper or fabric layer is adhesively bonded to a spacer structure, for example a textile, perforated board or a plastic grid. The fabric-covered spacer structure is in turn adhesively bonded to a sound-absorbing porous structure.

U.S. Pat. No. 5,681,408 describes a sound-absorbing multilayer wall covering where two relatively loose textiles are adhesively bonded to one another by means of a polyethylene film.

U.S. Pat. No. 4,283,457 describes a sound-absorbing wall covering in which a needle-punched felt made of glass fibers is adhesively bonded by means of a reactive adhesive to an open-porosity polyurethane foam. The material is described as having good sound absorption properties, but these properties are obtained on a very thick covering, having a thickness between 1 and 2 cm, and in the unpainted state. The needle-punched felt made of glass fibers that forms the surface layer of this covering does not lend itself or does not lend itself very well to the application of an acrylic or glyptal paint.

None of these documents discloses a covering based on glass textile having, even at low thickness and in the painted state, a sound absorption coefficient ($\alpha_w$) greater than or equal to 0.2 allowing a classification as a sound absorber according to the standard NF EN ISO 11654.

The applicant, after many diffuse-field sound absorption tests on painted or unpainted wall coverings, based on a glass textile adhesively bonded to a foam support, has succeeded in highlighting the following three trends:

The glass textile which will be in contact with the paint or with the atmosphere of the room must have an air permeability within a certain range. The air permeability must be sufficient so that sound can penetrate into the underlying foam layer, but should not exceed a value beyond which the material would have an unsatisfactory appearance in the painted state.

The adhesive layer attaching the glass textile to the foam support must not block all the surface pores of the support, in other words it must leave microscopic zones free where the sound that has passed through the surface layer can penetrate into the foam in order to be absorbed therein. The amount of adhesive must however be sufficient to enable good attachment of the glass textile to the foam support, failing which the sound absorption coefficient decreases.

The open porosity of the foam must be as high as possible. This is because it is at the interface between the walls of the foam and the air within the foam that sound is absorbed. The larger the size of this sound-accessible interface, the better the sound absorption coefficient will be.

The applicant thus observed that by optimizing the above three parameters (air permeability of the glass textile at the surface, structure of the adhesive layer and porosity of the foam support) it was possible to obtain thin wall coverings having, in the painted state, an $\alpha_w$ index, determined according to NF EN ISO 354 and NF EN ISO 11654, greater than or equal to 0.25.

Therefore, one subject of the present invention is a multilayer structure, intended to be used as a covering for walls, ceilings or floors, comprising:

(a) a support layer made of an organic polymer foam having an open porosity between 0.50 and 0.995, (b) a surface layer formed by a glass textile, having a static air flow resistance, measured according to the standard ISO 9053, between $10^5$ N·s·m$^{-4}$ and $10^6$ N·s·m$^{-4}$, preferably between $5 \times 10^5$ N·s·m$^{-4}$ and $8.5 \times 10^5$ N·s·m$^{-4}$, in particular between $7 \times 10^5$ N·s·m$^{-4}$ and $8 \times 10^5$ N·s·m$^{-4}$, (c) at the interface between the support layer (a) and the surface layer (b), a discontinuous adhesive layer having a surface density between 17 and 60 g/m$^2$.

In the present invention, the three layers (a), (b) and (c) are contiguous with one another, in other words, the adhesive layer (c) attaches the surface layer (b) directly to the foam support layer (a), without any other layer (for example aluminum foil, reinforcing layer or spacer layer) being present between layer (a) and (b).

The static air flow resistance values above are those measured for the glass textile in the unpainted state and, of course, before adhesively bonding to the foam.

The foam support forming layer (a) of the acoustic complex of the present invention is a soft and elastic foam, having open porosity, that is to say a foam where all the cells, or almost all the cells, are in communication with one another. Since the measurement of this open porosity is not the subject of standards, the method which was used for characterizing the foams of the support layer (a) is based on that described in the article by L. L. Beranek in "Acoustic impedance of porous materials", *J. Acoust. Soc. Am.*, 13: 248-260, 1942.

The open porosity of the foams used for the support layer (a) is preferably between 0.80 and 0.97, in particular between 0.83 and 0.96, and more particularly still between 0.87 and 0.95.

Mention may be made, as examples of such foams, of those based on polyurethane, especially on polyester urethane, neoprene, silicone, polyethylene, SBR latex and melamine.

In one preferred embodiment, the foams used are agglomerates formed from foam particles resulting from recycling and that are agglomerated, for example, using a binder or by simple heating under pressure.

The support layer (a) preferably has a density between 10 and 120 kg/m$^3$, in particular between 30 and 100 kg/m$^3$ and more preferably between 50 and 90 kg/m$^3$.

The air permeability of the support foam (a) is less determining than that of the surface layer (b). The applicant obtained good results with foams having a static air flow resistance, measured according to the standard ISO 9053, between 10 000 and 60 000 N·s·m$^{-4}$, preferably between 13 000 N·s·m$^{-4}$ and 50 000 N·s·m$^{-4}$, in particular between 14 000 and 40 000 N·s·m$^{-4}$.

Such foams are available on the market, in various thicknesses, under the names Agglo80 (agglomerated polyurethane foam sold by the company Carpenter), LM 2033, SKT 2537 and HYPORE 30 FR (polyurethane foams sold by the company FoamPartner), Basotech 3012 (melamine foam sold by the company FoamPartner) and Resorbson BS (melamine foam sold by the company Pinta Enac).

The foam used for the present invention will have a thickness between 2 and 5 mm, preferably between 3 and 4 mm, before incorporation in the multilayer structure. Due to its elasticity, it will essentially retain this thickness after adhesive bonding of the glass textile and of an optional underlayer.

As already explained in the introduction, it is essential in the present invention that the adhesive layer at the interface between the layers (a) and (b) is not a continuous layer, formed for example by insertion of an adhesive film, such as, for example, in FR 2 672 908, U.S. Pat. No. 5,681,408 or FR 0 061 369.

The adhesive layer (c) must firmly adhesively bond the glass textile (b) to the support (a), while leaving a maximum of pores located at the interface between the layers (a) and (b) open. It is unfortunately very difficult, or even impossible, to quantify precisely the proportion of closed or open surface pores in the finished product.

In order to arrive at satisfactory acoustic results, it is necessary to keep to certain application quantities per unit of surface and not to deposit the adhesive in the form of a continuous film or layer. The adhesive must be deposited so as to cover relatively homogeneously, on the macroscopic scale, the entire extent of the interface, but it will be ensured that, on the microscopic scale, only certain zones are covered with adhesive and others remain empty. Such a "discontinuous" application may be carried out for example using a hot-melt adhesive in the form of a web or grid that is solid at ambient temperature which is inserted between the foam support and the glass fabric before subjecting the assembly to heating, under pressure, at a temperature above the softening or melting point of the adhesive. It is also possible to envisage applying the adhesive in the form of a hot-melt adhesive powder onto the foam support (a) or onto the glass textile (b), then applying the second layer (b) or (a) and heating under pressure.

The chemical nature of the hot-melt adhesive is not a determining factor for the present invention and it will be possible to use conventional hot-melt adhesives based on polyurethanes, copolyamide (coPA) or copolymers of PET (coPET), such as for example the product Texiron 9D8 supplied by the company Protechnic.

Finally, the adhesive is not necessarily a hot-melt adhesive but may be a liquid composition of a reactive or thermosetting adhesive that is applied, for example, by printing to one of the two components to be adhesively bonded, making sure that the adhesive composition does not form a continuous film or layer.

The application in "discontinuous" mode described above will however only give good acoustic results if the application quantities specified above, between 17 and 60 g/m$^2$, preferably between 20 and 40 g/m$^2$, in particular between 21 and 30 g/m$^2$ and ideally between and 27 g/m$^2$ are also respected. Indeed, if the quantities of adhesive applied are significantly greater than 60 g/m$^2$ of surface, the hot-melt adhesive risks spreading at the time of melting until a continuous layer is formed that blocks the surface pores of the support foam, which must absolutely be avoided. Conversely, if the quantities applied are significantly below 17 g/m², the adhesive strength at the foam/glass textile interface risks being insufficient and the applicant observed that the finished product then has absorption coefficients that are considerably worse, of the order of 0.1 to 0.15.

When the adhesive layer (c) is formed by a hot-melt adhesive, the softening point of the latter is preferably at least 10° C., in particular at least 15° C. and ideally at least 20° C. below the softening point of the polymer forming the support layer (a). This is because it is necessary to prevent the porous structure of the foam from being unfavorably modified under the influence of the laminating heat and pressure.

When all of the instructions above regarding the application method and quantities are respected, the adhesive layer (c), in the finished product, consists of a network of points and/or lines extending homogeneously over the entire interface between the layers (a) and (b). The adjective "homogeneous" here has the meaning of uniform on the macroscopic scale, and encompasses both ordered and random patterns on the microscopic scale.

The glass textile forming the surface layer (b) may be a glass cloth (that is to say a woven fabric consisting of warp and weft yarns) or a web (that is to say a nonwoven). It is also possible to envisage a combination of the latter, for example a nonwoven reinforced by a woven structure. The present invention does not however encompass glass textiles such as glass felts having a very loose structure that are obtained by needle punching. Such textiles, when they have a satisfactory mechanical strength, specifically have a thickness that is too large and above all do not generally lend themselves to the application of a paint.

The glass textile is preferably a glass cloth, that is to say a woven fabric obtained from glass yarns composed of a multitude of glass filaments (or strands) or derivatives of these yarns, especially the assemblies of these strands as rovings.

The glass cloth or web may optionally contain a relatively limited fraction, generally less than 20% by weight, preferably less than 10% by weight, of fibers consisting of an organic material. These other fibers may be natural fibers such as silk fibers, wool fibers, wood fibers, cellulose fibers or cotton fibers; synthetic or artificial fibers such as viscose or rayon fibers, polyethylene fibers, polypropylene fibers, polyethylene terephthalate fibers, polystyrene fibers, polymethyl methacrylate fibers, polyamide fibers, polyvinyl chloride fibers, polyacrylonitrile fibers, polyvinyl acetate fibers, polyvinyl alcohol fibers, polyester fibers, polytetratfluorethylene fibers and aramid fibers; metallic fibers, for example silver fibers, copper fibers or steel fibers; carbon fibers; mineral fibers, for example basalt fibers, silica fibers, alumina fibers or ceramic fibers.

The glass incorporated in the composition of the yarns may be of any type, for example of E, C, R or AR (alkali resistant) type. In particular E glass is preferred.

The diameter of the glass filaments forming the yarns may vary to a large extent ranging, for example, from 5 to 30 μm. The linear density of filaments may be between 30 and 1500 tex.

Advantageously, the glass cloth comprises, as warp, a twisted glass yarn (textile yarn) and, as weft, an untwisted glass yarn that has undergone a treatment that aims to separate the glass filaments so as to give them volume ("volumized" yarns). The linear density of the warp and weft yarns preferably varies from 50 to 500 tex.

Conventionally, the cloth or web to be painted is coated with a sizing composition that maintains the yarns and gives them suitable rigidity so that the installation on the final support can be carried out properly.

The glass textiles used in the present invention are known in the art and are available on the market, for example under the name Novelio from the company Adfors. They preferably have a surface density between 80 and 450 g/m², in particular between 100 and 300 g/m² and more preferably still between 150 and 250 g/m².

The multilayer structure of the present invention may comprise, in addition to the three layers (a), (b) and (c) described above, a fourth layer, referred to hereinbelow as underlayer (d), preferably that is permeable to water vapor and is adhesively bonded to the face of the support layer (a) opposite the face in contact with the surface layer (b).

This layer may be, for example, a film of plastic, a sheet of paper, a perforated metallic film, a woven fabric, a nonwoven fabric or a combination thereof.

This layer is mainly intended to facilitate the coating with adhesive of the multilayer structure before application to the walls of the room of which the acoustic comfort is to be improved. This underlayer (d) may of course be pre-coated with adhesive.

Finally, the multilayer structure of the present invention may comprise a fifth layer, referred to hereinbelow as an overlayer (e), formed by a layer of paint applied to the surface layer (b).

This paint may be applied before adhesive bonding of the structure to the wall, or else the multilayer structure may be painted only after adhesive bonding to the wall.

The overlayer of paint (e) may be any paint commonly used for decorating living spaces. It may be an aqueous-based acrylic paint or a glyptal paint. The final layer of paint may be microporous or not. It is generally applied with a coating weight of less than 600 g/m², preferably in a proportion of from 50 to 500 g/m², and in particular in a proportion of from 100 to 350 m²/g.

As explained in the introduction, the choice of the materials of the various layers made it possible to obtain wall coverings having, in the painted state, sound absorption coefficients sufficient for allowing them to be classified as a sound-absorbing covering according to the standard NF EN ISO 11654 (classes D or E). This classification may be obtained for small thicknesses. The multilayer structures of the present invention therefore have an overall thickness between 3.5 and 6 mm, preferably between 4.0 and 5.5 mm.

The multilayer structures of the present invention may be manufactured according to lamination processes very similar to known processes and on existing installations commonly used for the manufacture of wall coverings.

In one such manufacturing process, which is a subject of the present invention, superposed, in order, are an organic polymer foam structure, a web of hot-melt adhesive and a glass textile, then the structure thus formed, comprising at least three layers, is subjected to a temperature at least equal to the softening point of the hot-melt adhesive, preferably while applying a pressure, for example by calendering.

One possible alternative to the use of a hot-melt web is the application of a powder or liquid adhesive composition to one of the faces of the foam or of the glass textile. The application may be carried out according to an ordered pattern (grid, network of equidistant points), for example by printing, or else according to a random pattern, for example by application of a powder or spraying of a liquid adhesive composition. After application of the adhesive composition, the organic polymer foam structure is brought into contact with the glass textile, preferably under pressure and heating, so as to adhesively bond the glass textile firmly to the organic polymer foam structure.

A final subject of the present invention is the use of a multilayer structure as described above for improving the acoustic comfort of a room or of a building. The process for improving the acoustic comfort comprises the application of a multilayer structure according to the invention, preferably by adhesive bonding, to one or more inner surfaces of said room or of said building, in particular to the walls.

EXAMPLES

Covering A (According to the Invention)

A polyurethane foam based on agglomerated foam particles, sold under the name Agglo80 by the company Carpenter, having an open porosity of 0.93, a density of 80 kg/m$^3$ and a static air flow resistivity of $1.6 \times 10^4$ N·s·m$^{-4}$ is laminated to a paintable glass cloth having a surface density of 220 g/m$^2$ and a static air flow resistivity of $7.7 \times 10^5$ N·s·m$^{-4}$. This lamination takes place using a web of hot-melt adhesive constituted of two-component fibers with a polyethylene terephthalate (PET) core and a coPET copolymer shell, this shell having a softening point below that of the central part made of PET homopolymer. The web of hot-melt adhesive has a surface density of 25 g/m$^2$. The three layers are superposed on one another and the assembly is adhesively bonded by heating at a temperature of around 90° C. under a calendering pressure of around 0.5 bar. The three-layer structure obtained has a total thickness of 5 mm. It is then adhesively bonded to BA13 plasterboard using a vinyl adhesive (Ovalit Ultra, from the company Henkel) and painted with a satin acrylic paint (150 g/m$^2$). A surface of 10.80 m$^2$ is thus used for the tests in a reverberation room (NF EN ISO 354) and the absorption coefficient calculated according to NF EN ISO 11654 is 0.3, which enables this three-layer structure to be classified in class D.

Covering B (According to the Invention)

The protocol for manufacturing Covering A above is repeated, except that use is made not of a web of adhesive having a surface density of 25 g/m$^2$, but of a grid of adhesive having an identical surface density.

Covering C (According to the Invention)

The protocol for manufacturing Covering A above is repeated, except that the foam based on polyurethane foam particles is replaced by a melamine foam, sold under the name Basotec® by the company FoamPartner, having a density of around 10 kg/m$^3$.

Covering G (According to the Invention)

The protocol for manufacturing Covering A above is repeated, except that use is made of a polyurethane foam filled with graphite particles (less than 10% by weight).

Covering H (According to the Invention)

The protocol for manufacturing Covering A above is repeated, except that use is made of a polyurethane foam A impregnated with a fire-retardant agent (80 kg/m$^3$). The fire-retarded foam therefore has a total weight of 160 kg/m$^3$.

Covering D (Comparative)

The protocol for manufacturing Covering A above is repeated, except that the foam based on polyurethane foam particles is replaced by a melamine foam, sold by the company SilentWay, having a density of around 10 kg/m$^3$. The foam has a thickness such that the total thickness of the covering is 3 mm.

Covering E (Comparative)

The protocol for manufacturing Covering A above is repeated, except that the web of adhesive having a surface density of 25 g/m$^2$ is replaced by a web of adhesive of the same chemical nature (PET/coPET) but having a surface density of 16 g/m$^2$.

Covering F (Comparative)

This example shows results obtained by numerical modeling for a glass fiber cloth, identical to that used in the preceding examples, an adhesive coating weight of 25 g/m$^2$, but where the foam has a porosity of 0.3.

The sound absorption coefficients of the six coatings are represented in the table below:

| Covering | Open-porosity foam | Adhesive (PET/coPET) | Surface density of the adhesive (g/m$^2$) | Total thickness of the covering (mm) | $\alpha_w$ |
|---|---|---|---|---|---|
| A | Agglomerated PU | Web | 25 | 5 | 0.30 |
| B | Agglomerated PU | Grid | 25 | 5 | 0.25 |
| C | Melamine | Web | 25 | 5 | 0.25 |
| G | Agglomerated PU with graphite | Web | 25 | 5 | 0.30 |
| H | Flame-retarded agglomerated PU | Web | 25 | 5 | 0.25 |
| D (comparative) | Melamine | Web | 16 | 5 | 0.20 |
| E (comparative) | Agglomerated PU | Web | 25 | 3 | 0.15 |
| F (comparative) | Foam with porosity of 0.3 | | 25 | 5 | 0.10 |

The results obtained show that the choice of the parameters defined in claim 1 make it possible to obtain thin wall coverings (5 mm) which, even in the painted state, have a sound absorption coefficient of at least 0.25 enabling them to be classified as sound-absorbing coverings.

The invention claimed is:

1. A multilayer structure, having an overall thickness between 3.5 and 6 mm, comprising:
   (a) a support layer made of an organic polymer foam having an open porosity between 0.50 and 0.995,
   (b) a surface layer formed by a glass textile, having a static air flow resistance, measured according to the standard ISO 9053, between 10$^5$ N·s·m$^{-4}$ and 10$^6$ N·s·m$^{-4}$,
   (c) at the interface between the support layer (a) and the surface layer (b), a discontinuous adhesive layer having a surface density between 17 and 60 g/m$^2$.

2. The multilayer structure as claimed in claim 1, wherein the support layer has a density between 10 and 120 kg/m$^3$.

3. The multilayer structure as claimed in claim 2, wherein the support layer has a density between 30 and 100 kg/m$^3$.

4. The multilayer structure as claimed in claim 1, wherein the support layer (a) has a static air flow resistance, measured according to the standard ISO 9053, between 10 000 and 60 000 N·s·m$^{-4}$.

5. The multilayer structure as claimed in claim 4, wherein the support layer (a) has a static air flow resistance, measured according to the standard ISO 9053, between 13 000 and 50 000 N·s·m$^{-4}$.

6. The multilayer structure as claimed in claim 1, wherein the adhesive layer (c) comprises a hot-melt adhesive having a softening point at least 10° C. below the softening point of the polymer forming the support layer (a).

7. The multilayer structure as claimed in claim 6, wherein the hot-melt adhesive has a softening point at least 15° C. below the softening point of the polymer forming the support layer (a).

8. The multilayer structure as claimed in claim 1, wherein the adhesive layer (c) consists of a network of points or lines or both extending homogeneously over the entire interface between the layers (a) and (b).

9. The multilayer structure as claimed in claim 1, wherein the surface layer (b) is a glass cloth or a nonwoven.

10. The multilayer structure as claimed in claim 1, wherein the surface layer (b) has a surface density between 80 and 450 g/m$^2$.

11. The multilayer structure as claimed in claim 10, wherein the surface layer (b) has a surface density between 100 and 300 g/m$^2$.

12. The multilayer structure as claimed in claim 1, further comprising an underlayer (d) adhesively bonded to the face of the support layer (a) opposite the face in contact with the surface layer (b).

13. The multilayer structure as claimed in claim 12, wherein the underlayer (d) is permeable to water vapor.

14. The multilayer structure as claimed in claim 1, further comprising a paint overlayer (e) applied to the surface layer (b).

15. The multilayer structure as claimed in claim 1, wherein the overall thickness is between 4.0 and 5.5 mm.

16. A process for improving the acoustic comfort of a room or of a building, comprising applying a multilayer structure as claimed in claim 1 by adhesive bonding, to one or more internal walls of said room or of said building.

17. A process for manufacturing a multilayer structure as claimed in claim 1, comprising superposing an organic polymer foam structure, of a web of hot-melt adhesive and a glass textile, and heating the structure comprising at least three layers thus formed to a temperature at least equal to the softening point of the hot-melt adhesive.

18. A process for manufacturing a multilayer structure as claimed in claim 1, comprising applying an adhesive composition in an ordered or random pattern to an organic polymer foam structure or to a glass textile or both, and contacting the organic polymer foam structure with the glass textile, so as to adhesively bond the glass textile to the organic polymer foam structure.

19. The multilayer structure as claimed in claim 1, wherein the open porosity is between 0.80 and 0.97.

20. The multilayer structure as claimed in claim 1, wherein the static air flow resistance, measured according to the standard ISO 9053, is between $5 \times 10^5$ N·s·m$^{-4}$ and $8.5 \times 10^5$ N·s·m$^{-4}$.

21. The multilayer structure as claimed in claim 1, wherein the surface density is between 20 and 40 g/m$^2$.

* * * * *